(12) United States Patent
Feyerabend et al.

(10) Patent No.: US 11,262,738 B2
(45) Date of Patent: Mar. 1, 2022

(54) DEVICE AND METHOD FOR MEASURING, SIMULATING, LABELING AND EVALUATING COMPONENTS AND SYSTEMS OF VEHICLES

(71) Applicant: Robert Bosch GmbH, Stuttgart (DE)

(72) Inventors: Achim Feyerabend, Heilbronn (DE); Elena Pancera, Ilsfeld (DE); Heinz Hertlein, Erlenbach (DE); Oliver Pink, Ditzingen (DE); Thomas Goeppel, Obersulm-Affaltrach (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 16/699,888

(22) Filed: Dec. 2, 2019

(65) Prior Publication Data
US 2020/0174461 A1 Jun. 4, 2020

(30) Foreign Application Priority Data

Dec. 4, 2018 (DE) .......................... 102018220896.4
Nov. 28, 2019 (DE) .......................... 102019218476.6

(51) Int. Cl.
*G05B 23/02* (2006.01)
*G05B 17/02* (2006.01)
(52) U.S. Cl.
CPC ......... *G05B 23/0227* (2013.01); *G05B 17/02* (2013.01)

(58) Field of Classification Search
None
See application file for complete search history.

(56) References Cited

U.S. PATENT DOCUMENTS 6,456,899 B1 * 9/2002 Gleason ........... G05B 19/41875
700/212

FOREIGN PATENT DOCUMENTS

DE 102011009588 A1 8/2011
DE 102012019301 A1 4/2014

* cited by examiner

*Primary Examiner* — Carlos R Ortiz Rodriguez
(74) *Attorney, Agent, or Firm* — Norton Rose Fulbright US LLP; Gerard Messina

(57) ABSTRACT

A method and a device for the functional testing and evaluation of a control system. The method for functional testing of sensors, actuators, and/or a control logic system of a control system controlled in at least a partly automated manner has the following: sending at least one stimulus to a sensor, an actuator, and/or to the control logic system of the control system; reading out at least one reaction of the control system from the sensor, from the actuator, from the control logic system, and/or from a connection between these components; and using a metric module to compare the reaction with a stored expected reaction, the metric module determining a metric according to which deviations of the read-out reaction from the expected reaction are to be evaluated with respect to the intended function of the control system.

11 Claims, 3 Drawing Sheets

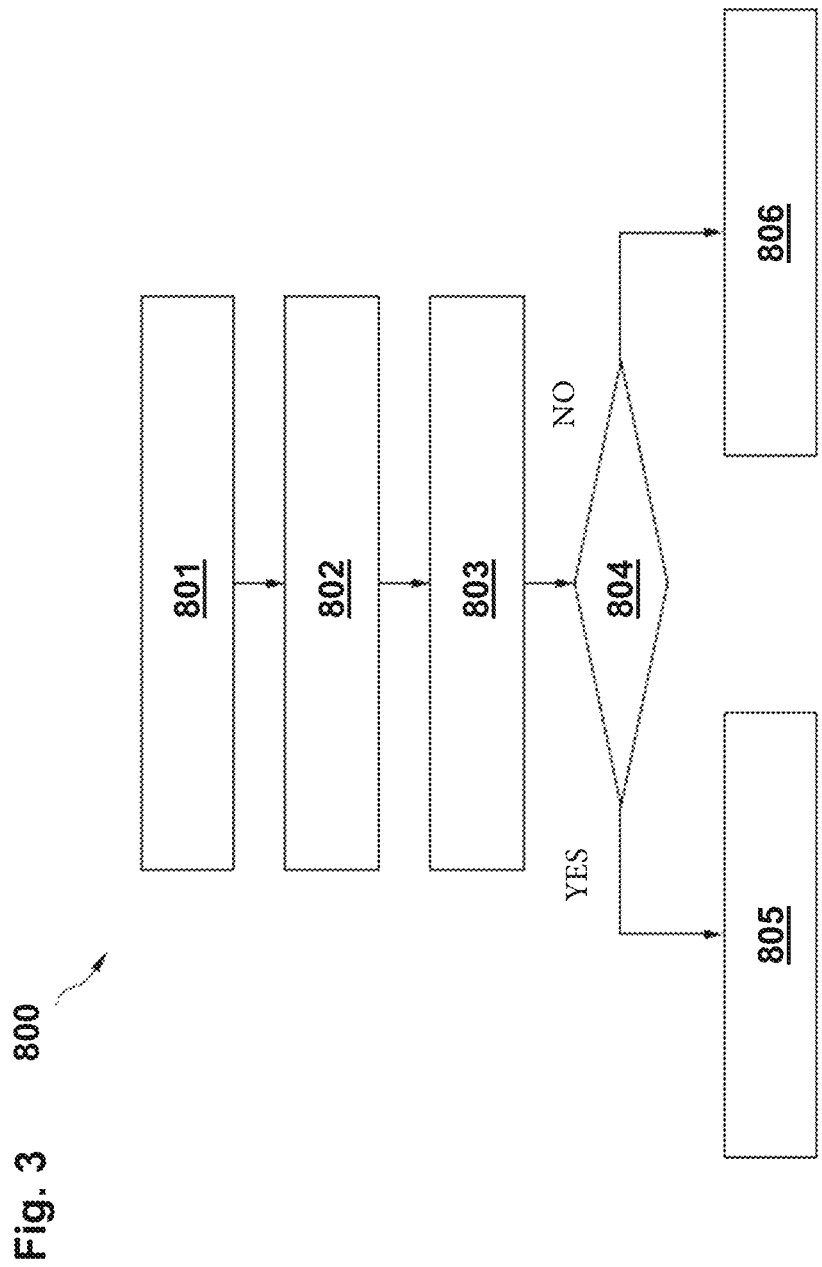

DEVICE AND METHOD FOR MEASURING, SIMULATING, LABELING AND EVALUATING COMPONENTS AND SYSTEMS OF VEHICLES

RELATED APPLICATION INFORMATION

The present application claims priority to and the benefit of German patent application no. DE 10 2018 220 896.4, which was filed in Germany on Dec. 4, 2018, and German patent application no. DE 10 2019 218 476.6, which was filed in Germany on Nov. 28, 2019, the disclosures of which are incorporated herein by reference.

FIELD OF THE INVENTION

The present invention relates to a method and a device for the functional testing and evaluation of a control system. The control system can include components of a vehicle or some other mobile apparatus. Moreover, the present invention relates to a use, a program element, and a computer-readable medium.

BACKGROUND INFORMATION

Recent vehicles, in particular vehicles that drive in at least partly automated manner, have a series of control systems, e.g. assistance systems, that in many cases are functionally linked to one another. This significantly increases the complexity of the vehicles, and therefore the demands made on a functional test and/or an evaluation system. Moreover, in such control systems, and/or in vehicles that contain these control systems, a high degree of testing coverage is required. For this purpose, multiple driving trials are done in which the behavior of a driving function, and thus of the control systems, is evaluated by a test driver or is examined on the basis of recorded measurement data. During this, the system behavior, i.e. the behavior of at least a part of the control systems, is evaluated on the basis of demands or indicators. However, in many cases the increased demands, e.g. with respect to testing coverage, can no longer be met by conventional tests.

SUMMARY OF THE INVENTION

An aspect of the present invention relates to a method for the functional testing of sensors, actuators, and/or control logic systems of a control system that is controlled at least partly in automated manner, having the steps:
  sending at least one stimulus to a sensor, to an actuator, and/or to the control logic of the control system;
  reading out at least one reaction of the control system from the sensor, from the actuator, from the control logic, and/or from a connection between these components; and
  comparing the reaction, using a metric module, with a stored expected reaction, the metric module specifying a metric according to which deviations of the read-out reaction from the expected reaction are to be evaluated with regard to the intended function of the control system.

The control system can be a control system for a robot and/or for a vehicle that drives in at least partly automated manner. The robot can be for example a bulldozer, a mower, or a piece of agricultural equipment. The vehicle can be a land vehicle, in particular a passenger vehicle, a transporter, a truck, a special vehicle operated on land, or an amphibious vehicle.

The control system that is tested, or that is to be tested, has for example a sensor, a control device, and an actuator. The control system can for example receive signals from the sensor, react to the signals, and control the actuator in reaction to the signals. The sensor can be a single sensor or a multiplicity of sensors, and it can include for example one or more cameras, lidar, radar, or other sensors. At least some of the sensors can be realized as a subsystem. In a vehicle having one or more assistance systems, the sensor can also act as a sensor for the driver's desired actions; for example it can acquire the position of the gas pedal and/or brake pedal. The sensor or sensors send the sensor signal; in the case of a plurality of sensors, this is therefore a multiplicity of sensor signals. The sensors send the sensor signal or signals in reaction to one or more objects in the real world. A measurement of a sensor can thus acquire an object in a surrounding environment, i.e. for example in a real world, and can output a sensor signal as a function of the object. The object in the surrounding environment may be a static or dynamic object in the real world, e.g. a house, a person, a vehicle, or a test image (e.g. for a camera) or a test object (e.g. for lidar or radar systems). As a function of the object, the sensor can output a sensor signal; e.g. in the case of a camera an unprocessed image (raw image) can be outputted, and in the case of a test image for example a data file that is precisely defined at least in some regions can be outputted. Other objects result in different sensor signals, which can be recognized as similar for example using pattern recognition. As a reference for the sensor data, for example so-called "ground truth" data can be used, supplied for example by a highly accurate reference sensor.

The measurement, simulation, and labeling system can process, in addition to the sensor signal, other inputs, in particular a multiplicity of further inputs that, in some specific embodiments, can be received from a multiplicity of further sensors, or also from other systems, for example a navigation system. The control system has internal states; a subset of these internal states is routed to an interface so that access can be had to these internal states. In this context "access" means that this subset of the internal states can be read and can also be set. In particular for a vehicle that drives in at least partly automated manner, this opens the possibility of so to speak jumping into the middle of a scenario, and thus of reproducing, in a quite deliberate manner, a particular situation (e.g. a particularly critical situation) without preliminaries, or with only a small preliminary runup. This can also be used to play through (replay) this situation with a new program that is to be tested, or a new version of the program, on the target hardware. In this case, it may be appropriate or necessary to reproduce the situation with a longer preliminary time or a complete preliminary time. The new program can be configured such that access can be had at least to those internal states that are relevant for this situation. The reproduction of the situation can also take place in such a way that the previously recorded data are not sent to the control system, but rather the processing with a new program, or a new program version, runs directly on a system set up for this purpose, e.g. a measurement, simulation, and labeling system, in a simulation. In this case, the sending and receiving of the signals (resimulation) can be omitted.

The "objects" of the sensors can also include the driver's desired actions named above. The control device receives the signals and, on the basis of these signals, carries out calculations in particular in order to react to the signals and thus to control for example the at least one actuator. The actuator output can be a physical signal; for example, the controlling of a brake system can cause a negative acceleration of the vehicle. The control signal—or, more generally, control data—can for example influence, in addition to the brake system, the drive train and/or the steering. For example, in reaction to a deceleration desired by an assistance system or by the driver, a brake actuator, and/or a brake subsystem that controls e.g. an ABS (anti-lock brake system), can be controlled.

For example during a driving trial, the stimulus can be sent to a sensor, an actuator, and/or to the control logic of the control system. The stimulus can also be recorded for example during a driving trial or a test drive; here, the sensor acquires, so to speak, "natural data," i.e. objects in the real world. In a specific embodiment, reference sensors can be used for this; that is for example highly accurate sensors or calibrated sensor systems. The test drive can be carried out on the basis of particular requirements (requirements-based). The data can then be applied to the entire vehicle, and/or to one or more components of the vehicle. The stimulus can include signals of inputs, outputs, and/or internal states of the vehicle, i.e. for example from sensors, actuators, and/or the control logic. The stimulus can include one or more test sequences. The stimulus can play through an overall scenario or, for example beginning with a particularly critical situation, can be sent as a partial scenario. Which signals are sent as stimulus is a function of which part of the control system, or possibly the entire control system, is to be examined. With the named signals, for example a regression test of the control system is possible. The control system in this way becomes a test object (device under test).

The stimulus causes a reaction of the control system, or of its components. This reaction of the control system is read out from the sensor, from the actuator, from the control logic system, and/or from a connection between these components. This can be carried out via the interfaces explained above.

The reaction of the control system is compared to a stored expected reaction, using a metric module. Here, the metric module determines a metric according to which deviations of the read-out reaction from the expected reaction are to be evaluated with respect to the intended functioning of the control system. The metric can include a comparison of the internal control states, e.g. of the control device. A simple metric can be based for example on a comparison metric; i.e. this metric can for example include an "equal/not equal" evaluation, and can consist in displaying differences between the actual or read-out reaction and the expected reaction, or the signals by which the reactions are shown. To name a simple example, such a difference may be caused by a malfunction of the control system and/or of one of the components of the control system. Such a difference can be caused in the case of the analysis of recognition systems in the sense of pattern recognition, such as for example environmental perception, but in particular can also be caused in that the result of these recognition algorithms can agree with the ideal, actual state (the "ground truth") only with a certain degree of accuracy, or only with a particular probability of error. For this reason, in such cases statistical metrics may be used. For such a statistical metric, first deviations are determined between the outputs of the recognition system to be evaluated, in this case designated test labels, and the assigned reference labels, i.e. the ground truth, or at least an approximate estimation of the ground truth. From a set of these deviations, statistical features are determined, such as the average deviation, or mean value and variance of this deviation, or the relative frequency of the deviations that exceed a specified threshold value. Each of these statistical features of the set of deviations represents a statistical metric. For example, the recognition system can be the environmental perception system, which receives sensor data as input and determines the attributes of dynamic objects, in particular other vehicles in the environment around the home vehicle. The attributes can be for example the position, size, and speed of the dynamic objects. An example of deviations in this case is the difference in magnitude between the positions determined by the environmental perception (the test labels) and the reference positions (the reference labels or the ground truth estimation). The reference labels can be ascertained for example by an off-line perception system that is a part of a measurement, simulation, and labeling system 600 (in FIG. 1). In this case, an example of a statistical metric is the mean value of the differences in magnitudes of the positions.

The metric, the statistical metric, or results calculated from the metric or from the statistical metric can for example be displayed via an output module.

A further aspect of the present invention relates to a method for functionally testing a classifier that assigns at least one label to physically acquired observations of a control system, the label relating to at least one attribute to be ascertained from the observation, the label being used in the operation of the technical system for the at least partly automatic controlling of the control system, having the steps:

assigning at least one data set that represents an observation to at least one test label according to the same rule used in the classifier;

assigning the same data set, with a reference recognition method, for example a reference classifier, to at least one reference label; and using a metric module to compare the test label or labels with the reference label or labels, the metric module determining a metric according to which deviations of the at least one test label from the at least one reference label are to be evaluated with respect to the intended function of the control system or of a component of the control system.

This specific embodiment relates in particular to a recognition method, for example a classifier in the sense of pattern recognition, that produces a symbolic representation of sensor data.

In the following, the components of the control system are understood to be the same as in the method explained above for the functional testing of sensors, actuators, and/or a control logic system.

A classifier assigns at least one label to the physically acquired observations of a control system. The label includes a symbolic, in particular time-dependent, description of an object in the environment surrounding the vehicle. A distinction can be made for example between static and dynamic objects. Here, for example the labels of the dynamic objects describe the dynamic objects with their attributes, where the attributes can include for example position, speed, acceleration, orientation, etc. For the labeling, the same signals can be used as for the functional testing of the control system and/or of the components of the control system. Additional signals may also be used.

A predefined subset of the signals of a control system or of its components can be represented as a data set. In each case, the data set represents an observation. At least one data set is assigned to at least one test label, according to the same rule used in the classifier. In this way, for example a regression test, which tests the control system or its components, can be constructed. The regression test can be carried out for example for a new component and/or when there is an exchange. The component can include hardware and software, including firmware.

The same data set is assigned to at least one reference label, with a reference classifier. The reference label can be for example a label that was produced for example in a reference run of the control system and/or was assigned as the correct label by a human operator. The reference classifier can be emulated by the human operator, or for example by a classifier that has been recognized as error-free at least with respect to this reference label.

Using a metric module, the test label is compared with the reference label or labels. Here, the metric module determines a metric according to which deviations of the read-out reaction from the expected reaction are to be evaluated with respect to the intended function of the control system or of a subcomponent of the control system.

Examples of Metrics in the Categories: Accuracy Metrics and Integrity Metrics

A simple metric can for example include an "equal/not equal" evaluation. A metric can also define a deviation between the test label and the reference label. The metric can thus be given by a distance measure. In this case, the metric can also be referred to as a distance metric. The metrics that are used do not necessarily have to be metrics in the mathematical sense. For example, the fulfillment of the triangle inequality does not necessarily have to be required. For example, the size of the difference can represent a distance metric for continuous attributes, i.e. for attributes that are represented by a rational number or its representation as a floating-point number. Another example of a distance metric is the square of the difference. In addition, a statistical metric can be calculated for a set or for a sequence of data sets, and the associated test labels and reference labels. This set is also referred to as a random sample, and the combination of the data sets in the labels is referred to as a labeled random sample. Given the use of distance metrics, the set of distances results from the labeled random sample, i.e. from the set of data sets having the associated test labels and reference labels. As a more general term or category for statistical metrics that determine statistical properties of this set of distances, the term "accuracy metrics" can also be used.

An example of a statistical metric that is an accuracy metric is the RMSE (square root of the mean of squared errors) between a test label and the assigned reference label. Another example of a statistical metric that is an accuracy metric is the MAE, or mean absolute error, i.e. the mean value of the magnitude of the difference between the test label and the reference label. Another example of a statistical metric is the number of deviations that exceed a specified threshold value, where the deviation is in turn defined by a distance metric. A further example of an accuracy metric is the variance of a deviation defined by a distance metric.

In addition to the category of accuracy metrics, a further category of integrity metrics can be defined. An integrity metric is based on the observation of the course of trajectories over time. Examples of integrity metrics are metrics that are based on the comparison of at least one test trajectory with at least one reference trajectory. The totality or the sequence of all attributes of an object over time can be designated a trajectory. The test trajectory is thus given by the totality or the sequence of all test labels assigned to the same object that are read out by the component that is to be evaluated of the control system. The reference trajectory is given by the totality of the reference labels that are assigned to the same object. A concrete example of an integrity metric is the false positive metric or ghost object metric. The ghost object metric considers the portion of a test trajectory for which no reference trajectory exists. This portion of the test trajectory can also be referred to as the ghost trajectory. The ghost object metric can be defined as the time portion of the ghost trajectory of a test trajectory in the overall temporal length of the test trajectory. Alternatively, the ghost object metric can be defined as the ghost trajectory path portion of the overall length of the path of the test trajectory. The corresponding portion can be referred to as a time ghost portion or as a location ghost portion.

A further concrete example of an integrity metric is the false negative metric or missed object metric. The missed object metric considers the portion of a reference trajectory for which no test trajectory exists. This portion of the reference trajectory can also be referred to as the missed trajectory. The missed object metric can be defined as the temporal portion of the missed trajectory of a reference trajectory in the overall temporal length of the reference trajectory. Alternatively, the missed trajectory can be defined as the missed trajectory path portion of the overall length of the path of the reference trajectory. The corresponding portion can be referred to as a time missed portion or location missed portion.

If integrity metrics are calculated for a set of trajectories and the statistical properties of the results are combined over all trajectories, this is in turn a statistical metric. For example, the mean value of all ghost portions or the mean value of all missed portions over all trajectories of the set can be considered. The mean value can be calculated on the basis of the time ghost portions or of the location ghost portions, or of the time or location missed portions. The mean value can be calculated as the mean value over the portions of all trajectories. The mean value can also be defined as the portion obtained by dividing the sum of all time or all location ghost portions by the sum of all overall temporal lengths of all test trajectories of the set. Analogously, corresponding mean values can be defined on the basis of the missed trajectories in order to define statistical missed object metrics.

The list given here of examples of metrics is not exhaustive.

In addition to the provided examples, further metrics are possible both with regard to the distance metrics and the statistical metrics. Other categories of metrics are also possible. Likewise, the concrete definition of a metric may differ from the examples given here, or the concrete realization may differ. For example, in the case of the ghost metric the number of sampled trajectory states may be calculated instead of the portion of the lengths. Different methods for norming are also possible; for example, the ratio of the number of samples of a ghost trajectory to the total number of samples of the corresponding test trajectory can be used.

Association of Trajectories

Both for accuracy metrics and for integrity metrics, an association of test trajectories with reference trajectories, or an association of segments of test trajectories with segments of reference trajectories, can be carried out. An association determines, for a test trajectory, which ground truth object or which ground truth objects can be presumed to be the cause of the respective test trajectory, or of the respective segment of the test trajectory, or whether a test trajectory, or a segment of a test trajectory, is a ghost trajectory. An association can be based for example on the time-dependent consideration of distance metrics between time-dependent attributes of the test trajectory and corresponding attributes of the reference trajectory. For example, a test trajectory can be assigned to that reference trajectory for which a defined distance metric goes to a minimum for one or more defined attributes. In addition, a threshold value can be defined such that an association is made only as long as the respective distance metric is below the threshold value.

The metric, or results calculated from the metric, can be displayed for example using an output module. The metric can be used for example to draw further-reaching conclusions, together with expert knowledge. Here, one or more metrics can be defined for each partial aspect of the test or tests, each of the metrics being used for the evaluation of a particular set of facts, quality criterion, and/or scenarios. For better manageability, the metrics can be divided into different metric categories. Depending on what is under consideration, the metrics can relate to the overall system (which can have a plurality of hardware and software components), and to individual system components or subsystems and/or to individual components (e.g. to one or more sensors, actuators, and/or control devices). The metric and/or an evaluation can in addition include the evaluation of automated driving functions. In addition, the evaluation can take into consideration the temporal curve of the respective criteria over a defined period of time. The metric and/or an evaluation can also include consolidated results of the criteria, such as mean value calculations and/or calculations of standard deviations.

Examples of metric categories of statistical metrics include accuracy metrics and integrity metrics.

Using the described method, the classifier and/or the control system or its components can be tested. The use of the described methods, and in particular of the classifier, in the testing of the control system or its components has the advantage that in this way tests can be carried out at a high level of abstraction. At the same time, a high degree of test coverage can be achieved, because for at least a part of the labels, with regard to production and comparison, a multiplicity of components must each have correct individual function and must work together correctly.

In some specific embodiments, using the named methods and in particular the metrics, only that part of the control system can be evaluated that takes over the processing and recognition of the sensor data of at least one sensor, the result of the recognition being a symbolic representation of the static and dynamic objects in the surrounding environment of the vehicle, with a set of object attributes (environment recognition module). In this case, only the sensor raw measurements from the measurement, simulation, and labeling system, and the output of the environment recognition module, are recorded and stored for example in a signal memory. In addition, the internal states of the environment recognition module can be recorded and stored in the signal memory. In this specific embodiment, the evaluation is done by comparing the recorded output of the environment recognition module to a reference. An additional reference sensor could also be used whose signals are also recorded as stimulus, expected reaction, and/or data set for the reference label. The data of these reference sensors could be used for example to generate the reference label. Alternatively or in addition, the reference label could also be produced or improved by manual labeling methods, i.e. by human operators, who produce the reference labels of the surrounding environment on the basis of image data of the surrounding environment of the home vehicle and/or visualizations of the non-image-based sensor data.

In another specific embodiment, synthetic reference labels can also be used, if the sensor measurement data, or the data of the environment recognition output, are not data recorded during a driving trial, but rather are artificially produced data from a simulated environment. In this case, the control system can be replaced completely or partially by a software simulation that reproduces the calculations of the control device. For example, the sensor raw data can be synthetically produced, and these synthetic data can be processed by the control device or by a simulation of the control device.

In a further specific embodiment, the output of the environment recognition module can be synthetically produced and sent to the modules at the control device (or to a simulation of these modules) that produce the actuator output. The output, resulting as a function of the particular specific embodiment, is then in turn read out and written to the signal memory, so that the evaluation can be carried out by the evaluation system analogously to the other specific embodiments, either with or without simulation.

In a specific embodiment, the metric module calculates the metric for a sequence of the signals stored in the signal memory. This could also be applied to the sending, as stimulus, and to the reception, e.g. as reaction and/or as classification to a sequence of the named signals. The metric module then carries out the evaluation by comparing the received sequence to a reference and evaluating it. In a specific embodiment, a measurement that contains the named signals, including the internal states, can be replayed purely sequentially, i.e. "like a film," so to speak.

In a specific embodiment, the measurement data recorded in the driving trial are pre-processed in a data storage and data abstraction step. Here, for example the individual measurement data files can be converted to a common data file format and stored in a previously defined structure. Here, the data for example can be converted to a predefined physical unit, transformed into the provided coordinate system, sorted on the basis of the time of measurement, and/or faulty or damaged data sets can be filtered out or corrected. In particular in sensors, it can be advantageous if the raw signals are recorded in the earliest possible processing step; this can be used for example to make it possible to trace the origin of faulty downstream signals—e.g. artefacts—or faulty system states. Recorded sensor raw signals can also be used in the production of so-called "phenomenological sensor models"; this can be helpful in the production of synthetic sensor data via simulation, for example in order to produce a large set of synthetic data, and thus also to make it possible to discover comparatively rare errors of the control system that may not be observable due to the limited set of data from recorded real test drives.

In a specific embodiment, parts of the sequence of the signals stored in the signal memory are divided into scenarios. In this way, a decomposition can be carried out, and in this way for example a vehicle that drives in at least partly automated manner can be evaluated in accordance with predefined partial aspects. In this way, the testing depth can be increased, and thus the higher demands for series production release, even for example of highly automated vehicles, and the higher complexity of an automated vehicle, can be taken into account. Via a so-called off-line perception, here data from the so-called field operational test (FoT) can also be used. These can be used for example to enrich a "catalog of scenarios." The evaluation can be enriched or improved for example through manual scenario labeling, or via additional data.

In a specific embodiment, the metrics are divided into metric categories, in particular different metric categories. This can be done in order to improve the manageability of the control system and/or of the test system. Depending on what is under consideration, or which "system under test" is selected, the metrics can relate to the overall system, which can include a plurality of hardware and software components. This can result in better structural organization and thus improved manageability of the evaluation system and/or of the control system.

In a specific embodiment, an evaluation of the control system or of the components of the control system takes place on the basis of the calculated metrics. The metrics can relate to individual system components, to individual subsystems, and/or to individual components, such as one or more sensors, actuators, and/or control devices, and/or their connections.

In a specific embodiment, the tested control system in addition includes at least one of the following signals and/or interfaces:
an internal sensor state of the sensor;
an internal actuator state and an actuator output of the actuator;
a sensor measurement of the surrounding environment; and/or
a vehicle signal from the vehicle.

In a specific embodiment, the measurement, simulation, and labeling system in addition receives the actuator output and/or reference sensor measurements of the objects, and stores these in the signal memory. The actuator output here can either be acquired directly at the actuator, or the effect of the actuator output on the vehicle can be acquired, e.g. by a tachometer, a gyrosensor, etc. The reference sensor measurements can be made for example by recording the test drive, using additional sensors. The acquisition of the reference sensor measurements simultaneously with the sensor signal can form for example a basis for a sensor simulation.

In a specific embodiment, at least parts of the actuator output and/or of the reference sensor measurements can be used for simulations of the vehicle.

In a specific embodiment, the reference sensor measurements contain a vehicle signal. A vehicle signal can include the physical reaction of the vehicle to instructions of the control unit. This can for example be acquired by a tachometer, gyrosensor, etc.

In a specific embodiment, the tested control system has a multiplicity of sensors, and at least some of the sensors have internal sensor states. In particular so-called "intelligent" sensors, in which a pre-processing is required before the sensor signal can be used by a system of the vehicle, have internal sensor states.

In a specific embodiment, the tested control system has a multiplicity of actuators, and at least some of the actuators have internal actuator states. This is the case in particular if the actuator is controlled via a dedicated subsystem, e.g. an ABS (anti-lock braking) subsystem.

A further aspect of the present invention relates to an evaluation system for a control system for evaluating driving functions of a vehicle that drives in at least partly automated manner, the evaluation system having:
a metric module that is set up to read out a reaction of the control system from a sensor, an actuator, and/or a control logic system, and/or from a connection between these components, when at least one stimulus is sent to the sensor, the actuator, and/or the control logic system; and to compare the reaction to a stored expected reaction and to determine a metric according to which deviations of the read-out reaction from the expected reaction are to be evaluated with respect to the intended function of the control system.

A further aspect of the present invention relates to an evaluation system for the functional testing of a classifier that assigns at least one label to physically acquired observations of a control system, the label relating to at least one attribute to be ascertained from the observation, the label being used in the operation of the technical system for the at least partly automatic controlling of the system, the evaluation system having:
a metric module that is set up to assign at least one data set that represents an observation to at least one test label, according to the same rule used in the classifier;
to assign the same data set, with a reference classifier, to at least one reference label; and to compare the test label or labels with the reference label or labels, the metric module determining a metric according to which deviations of the at least one test label from the at least one reference label are to be evaluated with respect to the intended function of the control system.

In a specific embodiment, the metric module determines the metric for a sequence of data sets. Here, the metric module can be set up to apply the comparison to a sequence of the signals stored in the signal memory.

In a specific embodiment, parts of the sequence of the data sets are divided into scenarios.

In a specific embodiment, the tested control system in addition includes at least one of the following signals and/or interfaces:
an internal sensor state of the sensor;
an internal actuator state and an actuator output of the actuator;
a sensor measurement of the surrounding environment; and/or
a vehicle signal from the vehicle.

A further aspect of the present invention relates to a use of a method as described above and/or in the following for a vehicle that drives in at least partly automated manner, and/or of an evaluation system as described above and/or in the following in a test and/or development system for a vehicle that drives in at least partly automated manner, as component of the verification and validation strategy, for series production release, during the development phase and/or over the entire product life cycle, in particular for a quantitative evaluation for automated driving functions.

A further aspect of the present invention includes a program element that, when it is executed on a processor unit in a computer, control device, or evaluation system, is set up to carry out one of the named methods.

A further aspect of the present invention includes a computer-readable medium on which the named program element is stored.

Further measures that improve the present invention are presented in more detail in the following, together with the description of the exemplary embodiments of the present invention, on the basis of Figures.

BRIEF DESCRIPTION OF THE DRAWINGS

FIG. 3 shows a further method according to a further specific embodiment of the present invention.

DETAILED DESCRIPTION

Figure 1:
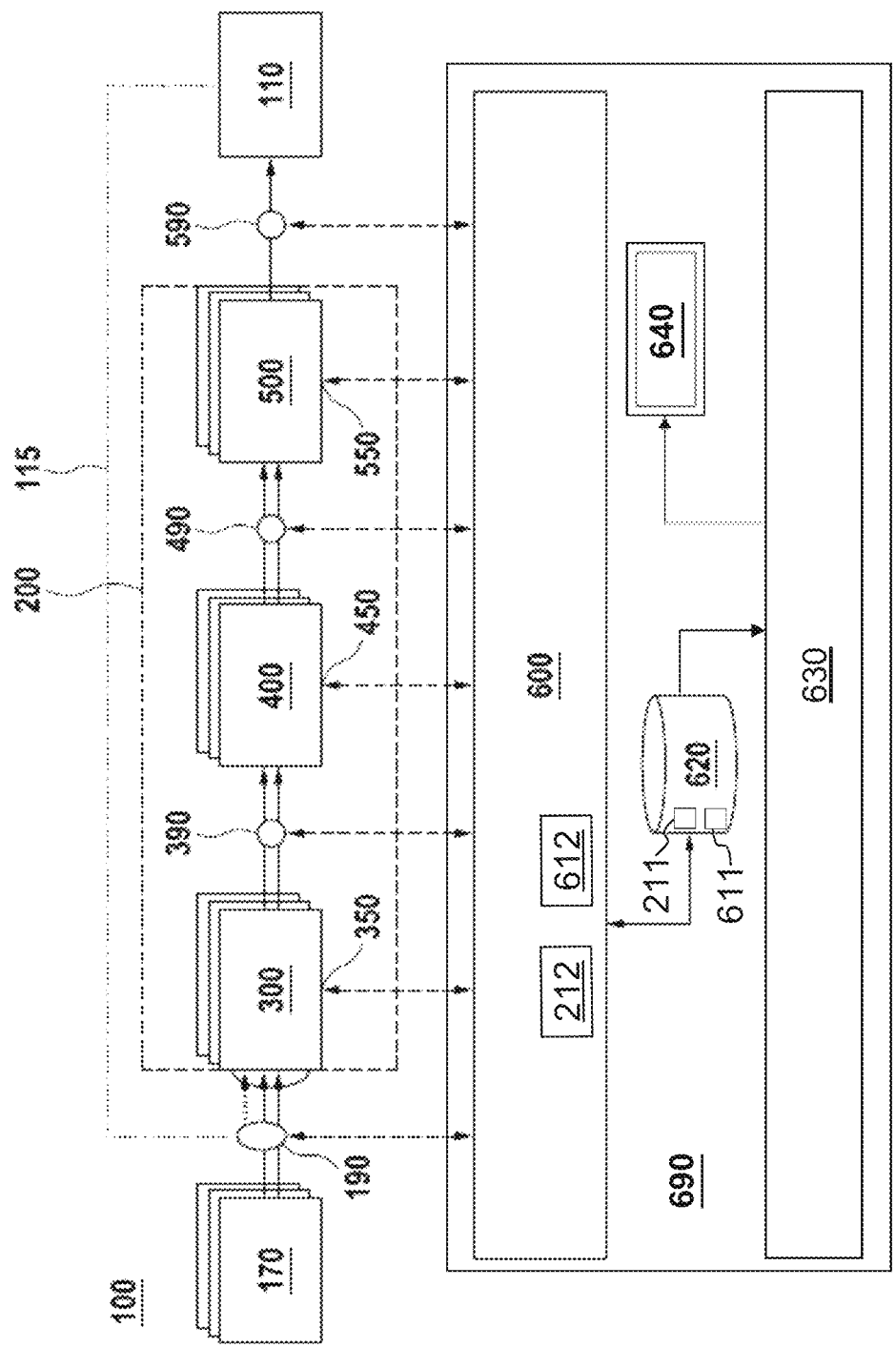
FIG. 1 shows an exemplary embodiment according to a specific embodiment of the present invention.

According to FIG. 1, a specific embodiment of the present invention has a control system 200, a measurement, simulation, and labeling system 600, and an evaluation system 630. Control system 200 has one or more sensors 300. With these sensors 300, sensor measurements 190 can be acquired of one or more objects 170 in a surrounding environment 100. Sensor or sensors 300 are set up to output a sensor signal 390 as a function of object 170. A portion of sensors 300 can be constructed as a more complex device, e.g. as a subsystem, and can have sensor states 350. Control system 200 has in addition a control device 400 that is set up to receive sensor signal 390 from sensor 300 and, using a program, to process it and to output a control signal 490. In addition to the sensor signal, the program can process further inputs, in particular a multiplicity of further inputs, that in some specific embodiments can be received from a multiplicity of further sensors or also from other systems, such as a navigation system. The program (and thus control system 200) has internal states; a subset of these internal states 450 is routed to an interface, so that access can be had to these internal states 450, in particular by measurement, simulation, and labeling system 600. "Access" means in this context that this subset of internal states 450 can be read and also set. In some specific embodiments, control system 200 can have a plurality of control devices 400. Control system 200 also has an actuator 500 that is set up to receive control signal 490 from control device 400 and, via actuator output 590, to bring about a change in the physical state of vehicle 110. Actuator output 590 is a physical signal; for example, the controlling of a brake system can cause a negative acceleration of the vehicle. This physical vehicle signal 115 of vehicle 110, for example the effect of the actuator output (but also other physical signals having an effect on vehicle 110) can be acquired for example by sensors 300 such as a tachometer, a gyrosensor, etc., and taken into account for example by control device 400. Some actuators 500 may also have internal actuator states 550.

In FIG. 1, below control system 200 evaluation system 690 is shown, having measurement, simulation, and labeling system 600. Evaluation system 690, or measurement, simulation, and labeling system 600, has access, via interfaces (shown in dashed lines) to the following signals of control system 200: sensor signal 390, sensor states 350 (for those sensors that have accessible sensor states), internal states 450, and control signals 490 of control device 400 (or the multiplicity of control devices 400), and actuator states 550. The interfaces are shown bidirectionally; that is, measurement, simulation, and labeling system 600 can on the one hand, in a monitoring mode, acquire these signals and store them for example in a signal memory 620. On the other hand, measurement, simulation, and labeling system 600 can send for example a portion of the signals from signal memory 620 as a stimulus, and can read out a reaction 212 of control system 200 from sensor 300, from actuator 500, from control logic system 400, and/or from a connection between these components. Metric module 630 can thereupon compare reaction 212 with a stored expected reaction 211 and evaluate the result. The comparison can include the calculation of metrics. A data set that represents an observation for example from the named signals can also be assigned to at least one test label 612. Metric module 630 can thereupon compare test label 612 with a reference label 611 that was assigned to the same data set with a reference classifier. From this a metric is determined according to which deviations of the at least one test label from the at least one reference label 611 are to be evaluated with respect to the intended function of control system 200. The metric can be in particular a statistical metric that first calculates a set of deviations between test labels 612 and assigned reference labels 611, and thereupon determines statistical properties of this set of deviations. The calculated metrics can be outputted to an output module 640. In the depicted specific embodiment, the measurement, simulation, and labeling system 600 can also bidirectionally access sensor measurements 190 and actuator output 590. This can be realized, for example in a physical vehicle 110, in that vehicle 110 is moved by a simulator (for example in the manner of a flight simulator), and predefined signals, such as from a film, are received. However, this can also be realized by replacing the vehicle with a simulation.

Figure 2:
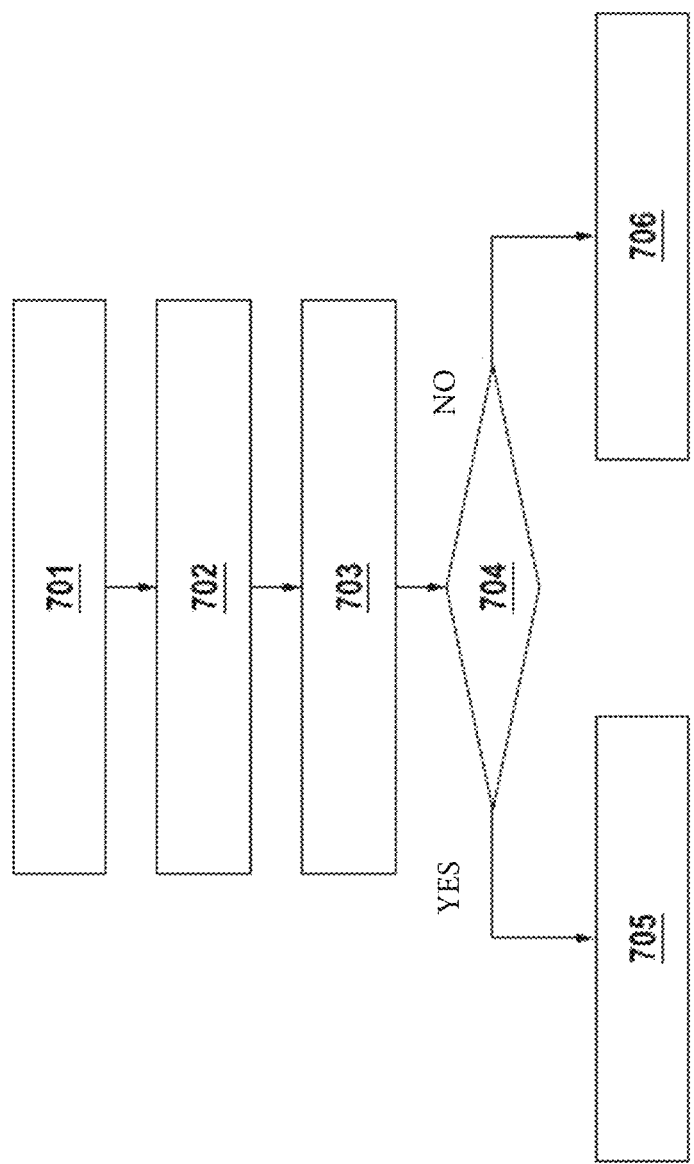
FIG. 2 shows a method according to a specific embodiment of the present invention.

FIG. 2 shows a method 700 according to a specific embodiment of the present invention. In a step 701, a sequence of signals is acquired and the signals are stored in a signal memory 620 of measurement, simulation, and labeling system 600 (see FIG. 1). Here, the signals can include at least one of a sensor signal 390, sensor states 350, internal states 450, and control signals 490 of control device 400 and actuator states 550. In a step 702, a stimulus is sent. In a step 703, a reaction 212 of control system 200 is read out from sensor 300, from actuator 500, from control logic system 400, and/or from a connection between these components. In a step 704, metric module 630 compares the signals of a received reaction 211 with a stored expected reaction 212, and carries out an evaluation as a function of the result of the comparison. A simple evaluation can be for example that in case of agreement of the signals the result of the comparison is evaluated as positive (step 705), and in case of non-agreement of the signals the result is evaluated as negative (step 706). In many specific embodiments of an evaluation system 630, significantly more extensive evaluations can be carried out on the basis of the data obtained by measurement, simulation, and labeling system 600 and evaluation system 630.

FIG. 3 shows a method 800 according to a specific embodiment of the present invention. Step 801 corresponds substantially to step 701 of FIG. 2. Depending on the goal of the evaluation, the signals can include either one or more sensor signals 390 or sensor states 350 or internal states 450 or control signals 490 of control device 400, or actuator states 550, or any combination of these signals. Thus, a functional test of a classifier can also be carried out. In this way, for example particular subsystems can be considered and evaluated separately. The signals are combined to form a data set. In step 802, at least one data set, which represents an observation, is assigned to at least one test label 612, according to the same rule used in the classifier. In a step 802, the assignment of the same data set, with a reference classifier, to at least one reference label 611 takes place. In a step 803, metrics for the stored signals, or for a portion of the stored signals, are determined by evaluation system 630. Here, the test label or labels 612 are compared with the reference label or labels 611. The comparison can be based for example on a comparison of the signals with the reference signals or reference labels. Here, there can be different types of metrics for the evaluation of different aspects of the signals, such as metrics for evaluating the accuracy of attributes of known objects on the one hand and metrics for evaluating the frequency of integrity errors in the tracking of objects, for example the occurrence of false positive ("ghosts") or false negative objects ("missed objects"/objects not recognized). In a step 804, metric module 630 evaluates the result of the metric calculation. For many types of metrics, it can also be possible to carry out the metric calculation without references. Plausibility metrics are an example of this. Thus, for example the attribute of object speed is compared to the derivative of the position coordinates with respect to time in order to ascertain a corresponding plausibility metric. If particular, defined requirements of the system, or the subsystem, to be evaluated are met by the calculated metrics, the comparison is evaluated as positive (step 805), and otherwise as negative (step 806).

Methods 700 and 800 can also be combined. Thus, signals can first be recorded and stored in signal memory 620, and then a part of the stored signals can be sent, as in method 700, to particular components in control system 200, and finally further signals of the control system can be received by measurement, simulation, and labeling system 600 and stored in signal memory 620. In addition, a generation of reference signals or reference labels can take place as in method 800, and on the basis of these references, metrics for the signals received after the sending can be calculated by metric module 630. These calculated metrics can be outputted to output module 640.

What is claimed is:

1. A method for evaluating a quality of a recognition process of or for a functional testing of the recognition process, the method comprising:
    assigning at least one data set that represents an observation to at least one test label according to a same rule used in the recognition process, wherein the recognition process includes a classifier that assigns to physically acquired observations of a control system at least one label that relates to at least one attribute to be ascertained from the observation, the label being used, in operation of a technical system, for the at least partly automatic controlling of the control system;
    assigning the at least one data set to at least one reference label, using a reference recognition method including a reference classifier;
    repeating the assignments to at least one test label and to at least one reference label for further data sets, the data sets each representing observations, so that a sequence of data sets results; and
    comparing, via a metric module, the assigned test label with the assigned reference label, the metric module determining, via a statistical evaluation, a statistical metric according to which deviations of the test labels from the reference labels are to be evaluated with respect to an intended function or output of the control system or a subcomponent of the control system.

2. The method of claim 1, wherein parts of the sequence of the data sets are divided into scenarios.

3. The method of claim 1, wherein the metrics, or the statistical metrics, are divided into metric categories, in particular accuracy metrics and/or integrity metrics.

4. The method of claim 1, wherein an evaluation of the control system or of the components of the control system take place based on the calculated metrics.

5. The method of claim 1, wherein the control system includes at least one of the following signals and/or interfaces:
    an internal sensor state of a sensor,
    an internal actuator state and an actuator output of an actuator,
    a sensor measurement of a surrounding environment, and/or
    a vehicle signal from the vehicle.

6. An evaluation system, comprising:
    a metric module, wherein the evaluation system is for evaluating the quality of a recognition process, including of a classifier, or for the functional testing of the recognition process that assigns to physically acquired observations of a control system at least one label that relates to at least one attribute to be ascertained from the observation, the label being used in operation of a technical system for the at least partly automatic controlling of the system, and wherein the metric module is configured to perform the following:
    assigning at least one data set that represents an observation to at least one test label according to a same rule used in the recognition process;
    assigning the at least one data set, with a reference recognition method, to at least one reference label;
    repeating the assignments to at least one test label and to at least one reference label for further data sets, the data sets each representing observations, so that a sequence of data sets results; and
    comparing the test label or labels with the assigned reference label or labels, the metric module determining the result of a statistical metric based on a set of assigned test labels and assigned reference labels using a statistical evaluation, according to which metric deviations of the test labels from the reference labels are to be evaluated with respect to an intended function or output of the control system or a subcomponent of the control system.

7. The evaluation system of claim 6, wherein parts of the sequence of data sets are divided into scenarios.

8. The evaluation system of claim 6, wherein the control system includes at least one of the following signals and/or interfaces:
    an internal sensor state of a sensor,
    an internal actuator state and an actuator output of an actuator,
    a sensor measurement of a surrounding environment, and/or
    a vehicle signal from the vehicle.

9. The method of claim 1, wherein the method is for a vehicle that drives in at least a partly automated fashion, as a component of a verification and validation strategy, for series production release, during a development phase and/or over an entire product life cycle, in particular for a quantitative evaluation for automated driving functions.

10. A non-transitory computer-readable medium having a computer program element, which is executable by a processor, comprising:
    a program code arrangement having program code for evaluating a quality of a recognition process of or for a functional testing of the recognition process, including of a classifier, that assigns to physically acquired observations of a control system at least one label that relates to at least one attribute to be ascertained from the observation, the label being used, in operation of a technical system, for the at least partly automatic controlling of the control system, by performing the following:
    assigning at least one data set that represents an observation to at least one test label according to a same rule used in the recognition process;
    assigning the at least one data set to at least one reference label, using a reference recognition method including a reference classifier;
    repeating the assignments to at least one test label and to at least one reference label for further data sets, the data sets each representing observations, so that a sequence of data sets results; and
    comparing, via a metric module, the assigned test label with the assigned reference label, the metric module determining, via a statistical evaluation, a statistical metric according to which deviations of the test labels from the reference labels are to be evaluated with respect to an intended function or output of the control system or a subcomponent of the control system.

11. The computer-readable medium of claim 10, wherein parts of the sequence of the data sets are divided into scenarios.

\* \* \* \* \*